United States Patent Office 3,330,787
Patented July 11, 1967

3,330,787
GRAFT POLYMERIZATION USING FERRATED THIOATED CELLULOSE SUBSTRATE, PRODUCTS THEREOF AND INTERMEDIATES
Robert W. Faessinger, Media, and John S. Conte, Ridley Park, Pa., assignors to Scott Paper Company, Delaware County, Pa., a corporation of Pennsylvania
No Drawing. Filed July 6, 1966, Ser. No. 563,055
21 Claims. (Cl. 260—17.4)

These inventions relate to processes for producing a copolymer of an ethylenically unsaturated monomer with substantially water insoluble substrates as defined herein by peroxidic free radical initiated graft polymerization and to the novel copolymers produced thereby. This application is a continuation-in-part of applications 271,491 and 271,492, filed Apr. 8, 1963; 339,324, filed Jan. 22, 1964; 345,577, filed Feb. 18, 1964; 432,816, 432,825, 432,834, 432,853, 432,855, 843,902, and 432,904, filed Feb. 15, 1965; and 491,395, filed Sept. 29, 1965, all now abandoned.

It is an object to provide novel graft polymerization processes. Another object is to provide graft polymerization processes free from one or more of the limitations or disadvantages of prior art graft polymerization processes. It is another object to provide novel graft polymers. Other objects will be apparent to those skilled in the art to which this invention pertains.

According to the processes described herein a substantially water-insoluble, sulfur-containing polymeric substrate as defined herein is reacted via peroxidic free radical initiated graft polymerization, with an ethylenic unsaturated monomer to produce a graft polymer.

Mino et al. U.S. Patent 2,922,768 discloses a process for graft polymerizing various polymeric materials using a ceric ion initiated system in which a reducing agent is present. The present graft polymerizations are peroxidic initiated and utilize polymeric substrates bearing substituents as defined herein which provide the other half of the redox system.

British Patent 818,412 discloses a redox graft polymerization system in which a ferrous, chromous, manganous, etc. ion is bound to the substrate by the ion exchange capacity of the substrate. The present graft polymerizations utilize sulfur containing substrates as defined herein to provide, with the peroxidic initiator, the redox system used to effect the graft polymerization.

There are problems associated with prior art graft polymerization processes, such as the need for an inert atmosphere, need to operate at either low, high or specific temperatures, use of expensive metal catalysts, use of dangerous radioactive materials (often leading to substrate degradation), need for non-aqueous system, need for concentrated reaction systems, etc. Oxidative processes using ozone or oxygen, like high-energy radiation, lead to serious strength losses of the substrate. Ceric ion-initiated chemical reactions produce excessive amounts of vinyl homopolymer. The present graft polymerizations are free from one or more of the aforesaid limitations and disadvantages. Moreover, the graft polymerizations have many advantages not possessed by other types of graft polymerizations.

The graft polymerizations described herein are novel in that both the substrate and monomer participating in the copolymerization may be of diverse nature. The substrate may be used in any of its conventional forms. The co-polymerization may be accomplished as a batch process or as a continuous tretament process. Through the proper practice of each invention, strength losses can be avoided and a highly efficient addition of the monomer or monomers to the substrate is accomplished. The properties of the substrate can be modified in virtually any manner desired by the choice of monomer or combination of monomers and the amount thereof grafted to the substrate.

The present graft polymerizations can be carried out in dilute aqueous solutions of monomer or monomers, as well as in concentrated solutions of monomer or monomers. Also, each may be conducted in either dilute or concentrated suspensions of the substrate.

An inert atmosphere is not essential, but may be used if desired. A very surprising aspect of the polymerizations is monomer solution need not be entirely free from polymerization inhibitors.

Extremes of temperature are not ordinarily necessary as the copolymerization will proceed at ambient temperatures.

*Peroxidic initiator*

The graft polymerizations described herein utilize a peroxidic initiator as part of the redox system. By redox system is meant the well known systems of the type described in D'Alelio, Gaetano F. Fundamental Principles of Polymerization, John Wiley and Sons, New York, 1952. Such peroxidic initiators include hydrogen peroxide, persulfates such as ammonium, sodium or potassium persulfate, hydroperoxides such as t-butyl hydroperoxide, diisopropylbenzene hydroperoxide, cumene hydroperoxide, 1-phenylethylhydroperoxide, etc., diacylperoxides such as benzoyl peroxide, acetyl peroxide and the like, di-alkyl peroxides such as di-t-butyl peroxide, dicumyl peroxide, etc.; peresters such as t-butyl peroxyacetate, t-butyl peroxybenzoate and the like; peracids such as performic acid, peracetic acid, perbenzoic acid, peroxylactic acid and the like; and others such as dialkyl peroxydicarbonates. These peroxy compounds must be capable of initiating a free-radical polymerization by themselves or in the presence of an activator, such as a reducing agent. The preferred group of peroxidic free-radical initiators are those that are water-soluble when the copolymerization is conducted in an aqueous medium.

As would be expected, the peroxidic initiator should be uniformly distributed throughout the monomer solution.

*Monomers*

The monomers which can be co-reacted with the substrate in the manner described herein to yield new graft polymers are those ethylenically unsaturated compounds which readily homopolymerize or readily copolymerize with other ethylenically unsaturated compounds either in bulk, or in an aqueous solution, or as an emulsion, when exposed to a redox system capable of initiating a polymerization or copolymerization. By the term monomer is meant an ethylenically unsaturated compound having the structure >C=C< which encompasses vinylene monomers of the general form CHR=CHR and vinylidene monomers of the general form $H_2C=CR_2$ and including the monomers on which all four of the open valence bonds are occupied by R substituents as well as those in which at least two R substituents, one on each carbon atom, form a ring derivative.

The radical R is selected from at least one member of the electron-acepting groups and electron-donating groups consisting of:

(1) Hydrogen.
(2) Alkyl, alkene and alkyne, the substituted as well as the unsubstituted in which the hydrocarbon moiety contains les than six carbon atoms such as methyl, ethyl, butyl, amyl, hexyl, ethenyl, hydroxymethyl, chloromethyl, etc.
(3) Aryl and substituted aryl such as phenyl, alpha-chlorotoyly, toyly, 4-chlorophenyl, alpha-toyl, xylyl, 2-bromo-4 ethylphenyl, etc.

(4) The electronegative groups, e.g., chloro, bromo, cyano, carboxy, carbalkoxy, acyloxyl, alkenyl, and the like.

(5) Alicyclic and heterocyclic, substituted and unsubstituted, such as pyridyl, thienyl, furyl, pyrrolidyl, etc.

(6) Groups of the general formula

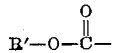

wherein R' is selected from the group consisting of hydrogen, R, and substituted as well as the unsubstituted hydrocarbons containing from 1 to 18 carbon atoms, such as methyl, ethyl, butyl, amyl, hexyl, heptyl, octadecyl, nitroethyl, nitrobutyl, N,N-dimethylaminoethyl, t-butylaminoethyl, 2-cyanoethyl, cyclohexyl, N,N-diethylaminoethyl, hydroxyethyl, hydroxypropyl and the like.

(7) Groups of the general formula

(8) Groups of the general formula

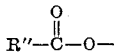

(9) Groups of the general formula

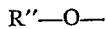

(10) Groups of the general formula

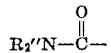

wherein R'' is selected from at least one member of the group consisting of hydrogen, R or R', aliphatic groups of from 1 to 18 carbon atoms and in addition the substituted as well as the unsubstituted hydrocarbons containing from 1 to 18 carbon atoms such as the methyl, ethyl, propyl, butyl, amyl, hexyl, heptyl octadecyl, chloroethyl, chloromethyl, hydroxyethyl, hydroxypropyl epoxyethyl, phenyl, p-chlorophenyl, and the like.

At least one of the members of the following group of ethylenically unsaturated monomers which readily homopolymerize or readily copolymerize with other ethylenically unsaturated compounds either in bulk, or in an aqueous solution, or as an emulsion may be used: ethylenicaly unsaturated aromatic compounds and mono, di, tri, tetra and penta substituted aromatic compounds, wherein the ring is substituted with at least one member selected from the class consisting of alkyl (substituted and unsubstituted) having from 1 to 7 carbon atoms and/or with inorganic electron-accepting and/or inorganic electron-donating groups such as halogen, nitro, sulfono, etc., and wherein the ethylenicaly unsaturated moiety has from 2 to 5 carbon atoms, either substituted or unsubstituted such as alpha-methylstyrene, p-chloromethylstyrene, o-methylstyrene, m-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, p-bromostyrene, o-chlorostyrene, m-chlorostyrene, beta-chlorostyrene, 2,5-dichlorostyrene, 4-ethoxystyrene, p-isopropyl-alpha-methylstyrene, beta-nitrostyrene, p-nitrostyrene and the like; also polymerizable alkylacrylic acids having from 1 to 5 carbon atoms in the alkyl chain provided, in all instances, when there is no alkyl chain, the substituent is hydrogen or some other specified moiety, such as halogens, cyano etc., e.g., acrylic acid methacrylic acid, alpha-chloroacrylic acid, 2-furfurylacrylic acid and the like; alkylacrylic acid esters having from 1 to 5 carbon atoms in the alkyl chain provided, in all instances, when there is no alkyl chain, the substituent is hydrogen or some other specified moiety, such as halogen, cyano, etc., and wherein the esters are formed from monohydric alcohols (substituted and unsubstituted) selected from the group consisting of alkyl alcohols having from 1 to 20 carbon atoms such as amyl acrylate, amyl methacrylate, benzyl methacrylate, benzyl acrylate, glycidyl methacrylate, butyl acrylate, butyl methacrylate, dodecyl acrylate, cyclohexyl acrylate, cyclopentyl methacrylate, ethyl acrylate, methyl-alpha-bromoacrylate, methyl-alpha-chloroacrylate, ethyl methacrylate, 2-ethylhexyl acrylate, heptyl acrylate, ethyl-alpha-bromoacrylate, hexyl methacrylate, lauryl methylacrylate, methyl acrylate, methyl methacrylate, stearyl acrylate, stearyl methacrylate, propyl acrylate, 2-bromoethyl acrylate, 2-chloroethoxyethyl methacrylate, etc.; the substituted amino alcohols having from 2 to 7 carbon atoms in the alkyl chain and from 1 to 7 carbon atoms in the alkyl chains on the amino moiety such as N,-N-dimethylaminoethyl acrylate, N - t - butylaminoethyl methacrylate, N,N-diethylaminoethyl acrylate, 2-N-morpholinethyl methacrylate and the like; nitro alcohols wherein the alkyl chain has from 2 to 7 carbon atoms such as 3-nitro-2-butanol, 2-nitro-3-hexanol, 2-methyl-2-nitro-1-butanol, 2-nitro-2-methyl propanol, etc.; cyanoalkyl alcohols wherein the alkyl chain has from 2 to 7 carbon atoms such as 2-cyanoethyl acrylate and the like; unsaturated polymerizable alkylacrylic acid amides having from 1 to 5 carbon atoms in the alkyl chain provided, in all instances, when there is no alkyl chain, the substituent is hydrogen or some other specified moiety described above, and also wheren the amide is formed from ammonia, primary and secondary amine or a diamine having from 1 to 16 carbon atoms (substituted and unsubstituted) such a acrylamide, methacrylamide, ethacrylamide, methylene-bis-acrylamide, t-butylacrylamide, 2 - cyanoacrylamide, N-(p-chlorophenyl) methacrylamide, N.N-diallylacrylamide, N,N-dimethylacrylamide, hexamethylene-bis-acrylaminde, N-alphanaphthylacrylamide, etc.; or the ethylenically unsaturated nitriles such as acrylonitrile, methacrylonitrile, ethacrylonitrile, alpha-chloroacrylonitrile and the like, polymerizable alkylene glycol and polyhydric glycol alkylacrylates and dialkylacrylates having 1 to 5 carbon atoms in the alkyl chain provided, in all instances, when there is no alkyl chain, the substituent is hydrogen or some other specified moiety described above, such as ethylene glycol dimethacrylate, triethylene glycol dimethacrylate, polyethylene glycol dimethacrylate, tetramethylene dimethacrylate, glyceryl triacrylate, hydroxyethyl methacrylate, hydroxypropyl methacrylate and the like; fatty acid esters of 1-olefins (substituted and unsubstituted), containing from 2 to 24 carbon atoms but preferably from 2 to 18 atoms wherein the 1-olefin alcohol precursor of the fatty acid esters has from 2 to 8 carbon atoms but preferably 2 to 3 carbon atoms, such as, vinyl acetate, vinyl propionate, vinyl butyrate, isopropenylacetate, vinyl-n-hexanoate, vinylchloroacetate, vinylcrotonate, vinyl-n-decanoate, vinyl-formate, vinyl-2-ethyl hexoate, vinyl laurate, vinyl oleate, vinyl stearate, vinyl trifluoroacetate, allyl linolate, allyl oleate, allyl acetate, allyl propionate, allyl chloroacetate, allyl caproate, allyl butyrate, etc.; aromatic acid esters (substituted and unsubstituted) of unsaturated alcohols wherein the alcohol precursor has from 2 to 8 carbon atoms but preferably from 2 to 3 carbon atoms such as allyl benzoate, diallyl phthalate, vinyl phthalate, vinyl benzoate, etc.; ethylenically unsaturated aliphatic diacids containing from 4 to 10 carbon atoms but preferably from 4 to 6 carbon atoms, and their esters, nitriles and amides such as, itaconic acid, maleic acid, fumaric acid, dimethyl maleate, dibutyl maleate, dimethyl fumarate, dibutyl fumarate, maleic anhydride, diethyl fumarate, etc.; polymerizable aliphatic dienes such as butadiene, 2,3-dimethyl butadiene, isoproprene, pentadiene, etc. and the haloprenes such as chloroprene and the like; 1-olefins (substituted and unsubstituted) containing from 2 to 18 carbon atoms but preferably from 2 to 8 carbon atoms such as vinyl chloride, vinylidene chloride, allylamine, diallylamine, diallylphosphate, allyl chloride, nitroethylene, butadiene monoxide, vinyl acrylate and the like; the vinyl ether (substituted and unsubstituted), as vinylethyl ether, vinylpropyl ether, vinylisobutyl ether, vinyl-2-methoxyethyl ether vinyl-n-butyl ether, vinyl 2-chloroethyl ether, vinyl-2-ethylhexyl ether and the like or other vinyl compounds such as divinylsulfone, divinylsulfide, divinylbenzene, etc.; ethylenically unsaturated heterocyclic compounds wherein the heterocycle contains from 3 to 5 carbon atoms and the hetero atoms are selected from the group consisting of N, O and S such as the vinyl pyridines, N-vinyl pyrrolidone, vinyl furan, alpha vinyl thiophene and the like. In general, the only requirement necessary in order for a monomer to be useful in this invention is that it has at least one olefinic double bond which readily homopolymerizes or readily copolymerizes with other ethylenically unsaturated compounds either in bulk, or in an aqueous solution, or as an emulsion.

More specifically, at least one member of the following group of polymerizable or copolymerizable monomers is useful; styrene, p-chloromethyl styrene, sodium p-styrene-sulfonate, vinyl toluene, 2,5-dichlorostyrene, alpha-methyl styrene, acrylamide, acrylic acid, acrylonitrile, N-t-butyl acrylamide, methacrylamide, N,N-methylene-bis-acrylamide, N,N-diethylacrylamide, methacrylic acid, t-butylaminoethyl methacrylate, N,N - diethylaminoethyl acrylate, N,N-diethylaminoethyl methacrylate, N,N-dimethylaminoethyl acrylate, 2-cyanoethyl acrylate, n-butyl acrylate, n-butyl methacrylate, decyl acrylate, decyl methacrylate, ethyl acrylate, 2-ethylhexyl acrylate, ethyl methacrylate, glycidyl acrylate, glycidyl methacrylate, n-hexyl methacrylate, n-lauryl methacrylate, methyl acrylate, methyl methacrylate, decyloctyl methacrylate, stearyl methacrylate, ethylene glycol dimethacrylate triethylene glycol dimethacrylate, tetraethylene glycol dimethacrylate, polyethylene glycol dimethacrylate, hydroxypropyl methacrylate, hydroxyethyl methacrylate, diallyl adipate, diallyl maleate, N,N - diallyl melamine, diallyl phthalate, diallyl phosphite, diallyl phosphate, diallyl fumarate, vinyl chloride, vinylidene chloride, maleic acid, itaconic acid, fumaric acid, di-n-butyl fumarate, di-n-butyl maleate, di-n-butyl itaconate, diethyl maleate, methyl vinyl ketone, 2-methyl-5-vinyl-pyridine, N-vinyl carbazole, 2-vinyl pyridine, 1-vinyl-2-pyrrolidone, N-vinyl pyrrolidone, vinyl-n-butyl ether, vinyl-isobutyl ether, vinyl-2-chloroethyl ether, vinyl ethyl ether, vinyl-2-ethylhexyl ether, vinyl triethoxysilane, vinyl stearate, vinyl butyrate, vinyl acetate, vinyl-2-ethyl-hexoate, vinyl propionate, divinyl benzene and divinyl sulfone.

*Substrates*

The water-insoluble substrates utilized in the graft polymerization processes described herein are ferrated mercaptoated cellulose.

The term "substantially water-insoluble" means a substrate whose solubility, in the form in which it is employed, in water at 30° C. or less does not exceed about 10 percent of its weight. Because the substrate used in the graft polymerizations described herein is usually formed under alkaline conditions, both it and the polymeric substance from which it is formed must also be substantially alkaline insoluble, at least at the alkaline pH used to form the substrate and to graft polymerize, if alkaline conditions are employed.

The ferrated mercaptoated cellulosic substrates described herein are iron containing products of cellulose oxyalkylene (substituted or unsubstituted), which term includes the cellulose oxypolyalkylene (substituted or unsubstited) sulfides. As described hereinafter, they can be produced by the reaction of alkali cellulose with an ethylene sulfide (substituted or unsubstituted) followed by reaction of the mercaptoated cellulose with a water soluble ferrous or ferric salt.

The cellulose substrate can be used in any of its conventional forms, e.g., as a powder, films, filaments, fibers and shaped objects. When in fiber or filament form, the substrate can be used as such or in the form of carding, roving, non-woven sheets, threads, yarns, knitted fabric, woven cloth, or garments.

The term "cellulose" means those forms of cellulose in which the cellulose molecule is chemically essentially unmodified, i.e., non-etherified, non-esterified, etc., and includes cotton, linen, rayon, hemp and sisal, in their various conventional forms, such as films, fibers or filaments as such or in the form of carding, roving, thread, yarn, cord, knitted fabrics, woven cloth, non-woven fabric, garments, etc., wood in its various forms, such as pulp, bleached and unbleached alpha-cellulose, ground wood, sawdust, wood shavings, chips, and excelsior, etc.

*Process using mercaptoated ferrated cellulose substrate*

In this process, ethylenically unsaturated monomers are graft copolymerized with an iron containing product of cellulose oxyalkylene (substituted or unsubstituted) sulfide, and/or cellulose oxypolyalkylene (substituted or unsubstituted) sulfide, in an aqueous medium, via free radical initiated polymerization. This invention also relates to a novel process for the preparation of intermediates useful for further graft polymerization of the cellulose derivatives. The novel intermediates, as well as the final products, are within the scope of the invention.

This invention overcomes prior art problems such as the need for inert atmosphere, low yields (limited monomer conversion), need to operate at either low, high or specific temperatures, use of expensive metal catalysts, use of other compounds to activate the expensive catalysts, need for high purity pulp, need to use reducing agents to initiate the reaction, need for concentrated reaction systems, need for restricted range of pH, etc.

The process herein described is novel in that the iron containing product of cellulose oxyalkylene (substituted or unsubstituted) sulfide or cellulose oxypolyalkylene (substituted or unsubstituted) sulfide and mixtures of both, is the cellulosic substrate to which an ethylenically unsaturated monomer or mixture of monomers is graft copolymerized. This process is applicable to all forms of cellulose, e.g., cotton and rayon in the form of fibers, threads or cloth as well as to wood pulp whether bleached or unbleached, fibrous or in sheets which have been mercaptoated and ferrated to form the iron derivative of the cellulose sulfide.

Mercaptoated cellulose as used herein is intended to mean cellulose which contains, bonded chemically to it, alkylene (substituted or unsubstituted) sulfide and/or polyalkylene (substituted or unsubstituted) sulfide; the polyalkylene sulfide may contain many recurring units, the number of units depending on the time, concentration, temperature, etc. of exposure of alkali cellulose to the particular sulfide.

In addition, this invention is applicable to ground wood, sawdust, wood shavings, excelsior and the like, which have been mercaptoated and ferrated to form the iron containing product.

This invention is also novel in that the ferrous or ferric ion may be used to form an iron containing product of cellulose oxyakylene (subsituted or unsubstituted) sulfide or cellulose oxypolyalkylene (substituted or unsubstituted) sulfide which is then used to initiate a polymerization that produces a graft copolymer. The iron containing product is part of a redox system.

The invention is also unique in that this process is capable of being carried out in dilute aqueous solutions of monomer, as well as in concentrated solutions of monomer. Also, this process may be conducted in either dilute or concentrated suspension of the cellulosic material, at pH independent conditions.

Still further, the process is novel in that an inert atmosphere is not essential, although the process may be carried out under inert atmosphere. Additionally, the ethylenically unsaturated monomers need not be entirely free from polymerization inhibitors.

The invention is accomplished by conducting a free radical initiated polymerization of an ethylenically unsaturated monomer or a mixture of these monomers in the presence of a cellulosic material which has been previously reacted with a substituted or unsubstituted alkylene sulfide and a soluble iron salt to yield an iron derivative of cellulose oxyalkylene sulfide or cellulose oxypolyalkylene sulfide.

The iron derivative of cellulose oxyalkylene sulfide or cellulose oxypolyalkylene sulfide is prepared by adding a soluble iron salt, such as, ferrous chloride or ferric chloride, to the mercaptoated cellulose and removing the excess iron salt by washing with water. Further, the iron containing derivative of cellulose oxyalkylene sulfide and/or cellulose oxypolyalkylene sulfide is copolymerized by free radical induced polymerization with a polymerizable ethylenically unsaturated compound, or polymerizable mixture of ethylenically unsaturated compounds. This graft copolymerization is carried out by suspending the iron containing derivative of cellulose oxyalkylene sulfide and/or cellulose oxypolyalkylene sulfide in an emulsion or solution of polymerizable ethylenically unsaturated monomer containing a peroxidic agent.

The invention is also accomplished by the process of producing a graft copolymer of ethylenically unsaturated compounds and derivatives of cellulose containing material comprising the steps of forming alkali cellulose; reacting alkali cellulose with an organic sulfide comprising of the structure

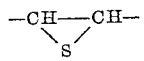

thereafter reacting the cellulose sulfide derivative with a soluble iron salt to yield a cellulose derivative capable of undergoing a redox copolymerization reaction; reacting the cellulose derivative in the presence of a peroxidic free radical initiator in an aqueous solution or in an aqueous solution in the presence of a dispersed emulsifying agent, which agent is present in an amount depending on the solubility of the ethylenically unsaturated monomer, said monomer being capable of forming copolymers with ethylenically unsaturated compounds; and purifying said graft copolymer. The products of the process are within the accomplished scope of the invention.

Further, the invention is accomplished by the process of producing a graft copolymer of ethylenically unsaturated compounds and derivatives of a cellulose containing material comprising the steps of reacting an alkali cellulose containing material with a sulfide selected from the group consisting of cyclic and heterocyclic compounds of from 4 to 8 carbon atoms which has the thiirane structure, as a substituent or part of the cyclic structure, and an alkylene sulfide of the formula

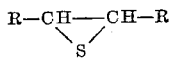

where the R's are selected from at least one member of the group consisting of hydrogen, alkyl of 1 to 7 carbon atoms; mono-, di- and trihalogen per carbon atom substituted alkyl groups of from 1 to 7 carbon atoms and depending on the position of the carbon atom in the chain the total substitution per carbon atom can be 1, 2 or 3, provided when R contains a single carbon atom, it is singly substituted by the halogen atom; alcohols of thiirane of from 1 to 7 carbon atoms; esters of said thiirane alcohols wherein the acid moiety is selected from the group consisting of fatty acids of from 1 to 7 carbon atoms, aromatic acids of from 7 to 15 carbon atoms; ethers of said thiirane alcohols wherein the alcohol moiety of said ether is selected from the group consisting of aliphatic alcohols of from 1 to 7 carbon atoms, aromatic alcohols of from 7 to 15 carbon atoms; thereafter reacting said cellulose sulfide derivative with a water soluble iron salt selected from the group consisting of water soluble ferrous salts or ferric salts to yield with said cellulose sulfide derivative a ferrated derivative capable of undergoing a redox copolymerization reaction; reacting the ferrated cellulose sulfide derivative in a buffered or unbuffered aqueous solution or in an aqueous solution containing a dispersed emulsifying agent in an amount depending on the solubility of the ethylenically unsaturated monomer, in the presence of at least one peroxidic free radical initiator.

To amplify the above, the cellulosic material to be used for graft copolymerization is first converted into alkali cellulose. This conversion is done by soaking the cellulosic substance in 0.05 to 18% solution of sodium hydroxide for ⅙ to 3 hours, but preferably in a 0.5 to 5.0% solution of alkali for ¼ to 1 hour. Other alkali materials such as lithium hydroxide, potassium hydroxide, barium hydroxide, calcium hydroxide, etc. may be used.

The alkali cellulose is filtered after the soaking period, and sufficient alkali liquor is removed in order that the resulting cellulosic pad contains residual alkali liquor equal to approximately twice or thrice the original dry weight of the cellulose.

The alkali cellulose pad is converted to the cellulose oxyalkylene sulfide by mixing it thoroughly with an alkylene sulfide, either in an organic solvent, emulsion, or water, or by exposing it to alkylene sulfide vapor of alkylene sulfides such as ethylene sulfide and/or propylene sulfide. The cellulose oxyalkylene sulfide which is to be graft copolymerized contains from about 6 to about 80% alkylene sulfide, but preferably from about 10 to about 55% alkylene sulfide. More particularly, useful alkylene sulfides are such as

where R and R' are either alike or different and may be H, $CH_3$, $CH_3-CH_2-$ etc., phenyl, substituted phenyl, $ClCH_2-$, $ClCH_2-CH_2$ etc., ethylene, propylene etc., $-CH_2OH$ and their esters and ethers. R' and R may join to form a cyclic compound, of the last, cyclic sulfide such as cyclohexane and cyclopentane sulfides are useful in the process. Other representative compounds, thiirane, 2-methyl thiirane, sym-dimethyl thiirane, 2-chloromethyl thiirane, 2-phenyl thiirane, bithiirane, and sym-dithiirane methyl ether.

The mercaptoated pulp is washed with water and acetone to remove any soluble substances. The pulp is then dried to determine the amount of the alkylene sulfide which has been picked up. Following the above step, the cellulose oxylalkylene sulfide is converted to ferrous cellulose oxyalkylene sulfide. The conversion of cellulose oxyalkylene sulfide to the ferrous celulose oxyalkylene sulfide derivative is effected by passing an excess of a dilute solution of ferrous chloride, ferrous ammonium sulfate, ferrous sulfate or any other soluble ferrous salts over and through the cellulosic oxyalkylene sulfide material followed by a water wash in order to remove all excess ferrous ions. The ferric cellulose oxyalkylene sulfide derivative is prepared in the same way using water soluble ferric salts. Hence, the ferric cellulose oxyalkylene sulfide derivative as well as the ferrous celulose oxyalkylene sulfide derivative is included within the scope of this invention. However, the preferred is the ferrous derivative. Representative salts of the above classes are such as ferric bromide, ferric chloride, ferric nitrate, ferric sulfate; ferrous acetate, ferrous ammonium sulfate, ferrous bromide, ferrous chloride, ferrous nitrate, ferrous sulfate.

After ferration, the celulose oxyalkylene sulfide is suspended in an emusion or solution of the polymerizable ethylenically unsaturated monomer, of which the monomer or di-, tri- or ter-monomer or mixture of monomer concentration in the emulsion or solution is of from about 1 to 100%. After admixture with the monomer, or monomer solutions, the concentration of the iron derivative of cellulose oxyalkylene sulfide is kept at from about 0.05 to about 99.9%.

The monomers which are capable of being copolymerized with the iron derivative of cellulose oxyalkylene sulfide to give high yields of graft copolymers are those ethylenically unsaturated compounds which readily homopolymerize, or readily copolymerize with other ethylenically unsaturated compounds in an aqueous solution or an emulsion, when exposed to the action of a redox system capable of initiating such polymerization or copolymerization.

The pH of the monomer emulsion or solution is buffered (if desired) from about pH 10 to pH 1.0, but preferably from about pH 7.0 to pH 2.5, and more particulraly of from about pH 7.0 to pH 4.0, depending also on the monomer to be grafted. However, the polymerization system is pH independent and the variation in pH is used for purposes such as faster reaction rate and more complete reaction. The emulsion or solution of the monomer includes a peroxidic agent such as hydrogen peroxide, ammonium or alkali metal persulfate, t-butyl hydroperoxide, cumene hydroperoxide, benzoylperoxide, or any other such agent which is known to inıtate free radical polymerization. The polymerization is allowed to progress at a temperature of about 0° to 100° C., at atmospheric or superatmospheric pressure for a time sufficient to obtain the desired amount of conversion of monomer to polymer. The polymerization time may be as little as five minutes to as long as 96 hours. The gaseous monomers are conveniently reacted in a high pressure vessel.

In order to describe the present invention so that it may be more clearly understood, the following examples are set forth in which all parts are expressed in parts by weight unless otherwise stated. Thes examples are set forth primarily for the purpose of illustration, and any specific enumeration of detail contained therein should not be interpreted as a limitation on the concept of this invention.

EXAMPLE 1

In a vessel were placed 10 parts of defibered West Coast bleached sulfiite pulp (dry) and enough 0.5% sodium hydroxide solution to cover the pulp completely. This mixture was allowed to stand at room temperature for about ½ hour, then filtered to a point of dryness where the moist pad of alkali cellulose weighed approximately 20 parts. This constituted a 100% pickup of alkali solution.

The alkali cellulose pad was crumbled and then placed in a vacuum desiccator over ethylene sulfide for about 4.0 hours, or as long as it was necessary to pick up from about 6 to 80% ethylene sulfide.

The ethylene sulfide pulp crumbles were defibered, filtered, washed with water, and then with acetone in order to remove completely all soluble products which had been formed during the reaction process. After washing, the ethylene sulfide pulp was dried for two hours at 110° C. The dried pulp weighed 11.8 parts which constitutes an 18.2% increase in weight. Ten parts of the above material were defibered and filtered; and, without drying or removing the pulp from the filter bed, 25 parts of M/2 ferrous chloride solution were passed through the fiber pad, followed at once by water (100–250 parts) to remove excess ferrous ions. This ferrous cellulose oxyethylene sulfide derivative was added to an emulsion consisting of 10 parts of 2-cyanoethylacrylate, 400 parts of water, 0.2 part of Tween-85 (a polyoxyethylene sorbitan trioleate) and 4 parts of 30% hydrogen peroxide and then adjusted to pH 4.0. Upon standing at room temperature for 48 hours, the pulp was removed from the polymerization medium and thoroughly washed with water. The dried pulp weighed 20 parts which constitutes a 100% increase in weight. Extraction of the above product with acetone showed a loss of about 26.8%.

EXAMPLE II

Ten parts of West Coast bleached sulfite pulp containing 22.1% ethylene sulfide were ferrated as described in Example I. Immediately after the pulp has been ferrated and washed, it was suspended in an emulsion prepared from 10 parts of 2-cyanoethylacrylate, 400 parts of M/20 potassium hydrogen phthalate, 0.7 part of Tween-85, 60 parts of 1% ammonium persulfate and 1.0 part of t-butyl hydroperoxide. After 16 hours at room temperature, the pulp was washed with water and dried. The product yield amounted to 19.7 parts which constitutes a 97% conversion of monomer to polymer. Prolonged extraction with acetone (or dimethylformamide) showed at 10% loss in weight indicating 90% of polymer formed was grafted to the cellulose.

EXAMPLE III

Ten parts of West Coast bleached sulfite pulp containing 36.5% ethylene sulfide were ferrated, as described in Eaxmple I, and then added to 10 parts of acrylic acid, 200 parts of water and 4 parts of 30% hydrogen peroxide. After 24 hours, the product was washed with water and acetone and dried. The yield obtained amounted to 16.6 parts which constitutes 66% conversion of monomer to polymer, all of which was grafted.

EXAMPLE IV

Ten parts of West Coast bleached sulfite pulp containing 15.3 % ethylene sulfide were ferrated, as described in Example I, then dispersed in a solution consisting of 10 parts of acrylamide, 140 parts of water, 10 parts of Beckman 3581 concentrated buffer pH–7.0, 60 parts of 1% ammonium persulfate and 1 part of t-butyl hydroperoxide. After 18 hours, the product was dispersed in 300 parts of water and filtered. After washing well with water and drying, the yield amounted to 17.4 parts which constitutes a 74% conversion of monomer to unextractable polymer. In place of Beckman 3581 buffer, conventional buffers such as a mixture of sodium dihydrogen phosphate, disodium hydrogen phosphate may be used.

EXAMPLE V

Ten parts of West Coast bleached sulfite pulp containing 19.5% ethylene sulfide were ferrated as described in Example I. Immediately after the pulp had been ferrated and washed, it was suspended in an emulsion prepared from 9.0 parts of styrene, 340 parts of water, 10 parts of Beckman 3581 concentrated buffer pH–7.0, 0.4 part of Tween-85, 60 parts of 1% ammonium persulfate and 1 part of t-butyl hydroperoxide. After 72 hours the pulp was washed with water and dried. The yield of product amounted to 17.1 parts, which constitutes a 78.8% conversion of monomer to polymer. Prolonged extraction in dimethylformamide showed a 9.2% loss in weight, indicating 90.8% of polymer formed was grafted to the cellulose.

EXAMPLE VI

Ten parts of bleached southern pine sulfate pulp which was converted to the mercaptoated cellulose as described in Example I and containing 26.0% ethylene sulfide, were ferrated as described in Example I and then added to a solution consisting of 10 parts of acrylamide, 140 parts of water, 10 parts of Beckman 3581 concentrated buffer pH–7.0, 60 parts of 1% ammonium persulfate and 1 part of t-butyl hydroperoxide. After 72 hours, the product was dispersed in 300 parts of water and filtered with suction. After washing well with water and drying, the yield amounted to 19.5 parts which constitutes a 95.0% conversion of monomer to unextractable polymer.

EXAMPLE VII

Ten parts of bleached southern pine sulfate pulp containing 26.0% ethylene sulfide were ferrated as described in Example I and then added to an emulsion prepared from 10 parts of acrylonitrile, 400 parts of water, 0.4 part of Tween-85, 4 parts of 30% $H_2O_2$ and 0.6 part of t-butyl hydroperoxide. After 72 hours, the product was filtered and washed with water. Upon drying, the yield amounted to 14.6 parts. Prolonged extraction with dimethylformamide showed a 1.5% loss in weight. The conversion of monomer under these conditions was 46.0%, of which 98.5% was unextractable.

EXAMPLE VIII

Ten parts of unbleached ground wood which was converted to the ethylene sulfide derivative (23% ethylene sulfide) and ferated as described in Example I and then added to an emulsion prepared from 9.0 parts of styrene, 140 parts of water, 10 parts of Beckman 3581 concentrated buffer pH–7.0, 60 parts of 1% ammonium persulfate, 0.4 part of Tween–85 and 1.0 part of t-butyl hydroperoxide. After 24 hours at room temperature, the product was washed with water and dried. The yield of product amounted to 15.2 parts which constitutes a 57.3% conversion of monomer to polymer. Prolonged extraction in dimethylformamide showed a weight loss of only 3%.

EXAMPLE IX

Into a 400 ml. beaker were placed 10 parts of excelsior with sufficient 2.0% sodium hydroxide solution to completely cover the wood. After soaking the excelsior for 2 hours, the alkali liquor was removed by filtration and the moist excelsoir was exposed to ethylene sulfide vapor in a vacuum desiccator for about 4 hours. After washing with water and acetone, the yield of product amounted to 14.1 parts, which constitutes 41% pickup of ethylene sulfide.

Ten parts of the above ethylene sulfide-excelsior were suspended in water for ½ hour following which 25 parts of M/2 ferrous chloride were added. After ¼ hour, the excelsior was filtered, washed with water, then suspended in 10 parts of acrylic acid, 100 parts of water and 3.0 parts of 30% hydrogen peroxide. After 24 hours, the excelsior was filtered free of the polymerization solution, washed with water and dried. The product consisted of 14.2 parts which constitutes a conversion of monomer to unextractable polymer of 42%.

EXAMPLE X

Ten parts of cotton thread, which was converted to the ethylene sulfide derivative (27% ethylene sulfide) and ferated as described in Example IX, were suspended in an emulsion prepared from 10 parts of 2-cyanoethylacrylate, 100 parts of water, 50 parts M/20 potassium hydrogen phthalate, 0.4 part of Tween–85, and 4 parts of 30% hydrogen peroxide for 24 hours at room temperature. The cotton thread was removed from the reaction medium and washed with water. The yield was 12.2 parts, which constitutes a conversion of monomer to polymer on the thread of about 22%. Extraction with dimethylformamide showed no loss in weight.

EXAMPLE XI

Ten parts of West Coast bleached sulfite pulp were converted to the cellulose ethylene sulfide derivative (34% ethylene sulfide) and ferated as described in Example I. After the ferration, the pad was washed with 70 parts of acetone and wrapped in brown paper and stored in the dark. After 40 hours, it was dispersed in an emulsion prepared from 10 parts of 2-cyanoethylacrylate, 375 parts of water, 25 parts of M/20 potassium hydrogen phthalate, 0.4 part of Tween–85 and 4 parts of 30% hydrogen peroxide. After 24 hours, the pulp was removed from the reaction medium and washed with water. The product gave a yield of 19.3 parts, which constitutes a 93% conversion of monomer to polymer. Extraction with acetone showed a 20.7% loss in weight.

EXAMPLE XII

Ten parts of West Coast sulfite pulp containing 33.4% ethylene sulfide were defibered and filtered; and, without removing the pulp, 25 parts of M/2 ferric chloride solution was passed through the fiber pad, followed at once by water (100–250 parts) to remove excess ferric ions. The ferric cellulose oxyethylene sulfide derivative was added to an emulsion consisting of 10 parts of 2-cyanoethylacrylate, 350 parts of water, 50 parts of M/20 potassium hydrogen phthalate, 0.4 part of Tween–85 and 4 parts of 30% hydrogen peroxide. After 72 hours, at room temperature, the product was washed and dried. The yield of product amounted to 19.6 parts which lost 22% of its weight when extracted with acetone.

EXAMPLE XIII

Ten parts of bleached southern pine containing 36% ethylene sulfide were ferrated as described in Example I and suspended in an emulsion prepared from 10 parts of isoprene, 400 parts of water and 4 parts of 30% hydrogen peroxide. After 48 hours, the product was washed and dried. The yield of product amounted to 13 parts, which constitutes a 30.0% conversion of monomer to polymer. Extraction with benzene showed a weight loss of about 15%.

EXAMPLE XIV

Ten parts of West Coast bleached sulfite pulp containing 13.7% propylene sulfide were ferrated as described in Example I. Immediately after the pulp had been ferrated and washed, it was suspended in an emulsion prepared from 10 parts 2-cyanoethylacrylate, 340 parts of M/20 potassium hydrogen phthalate, 0.5 part of Tween–85, 60 parts of 1% ammonium persulfate and 1.0 part of t-butyl hydroperoxide. After 18 hours, the pulp was washed with water and dried. The product yield amounted to 19.65 parts which constitutes a 96.5% conversion of monomer to polymer. Prolonged extraction with acetone showed an 18% loss in weight indicating 82% of polymer formed was grafted to the cellulose.

EXAMPLE XV

Ten parts of bleached southern pine sulfate pulp which contained 8% propylene sulfide were ferrated as described in Example I, and then added to a solution consisting of 10 parts of acrylamide, 100 parts of water, 10 parts of Beckman 3581 concentrated buffer pH–7.0, 60 parts of 1% ammonium persulfate and 1.0 part of t-butyl hydroperoxide. After 18 hours, the product was dispersed in 300 parts of water and filtered with suction. After washing well with water and drying the yield amounted to 15.8 parts which constitutes a 58.0% conversion of monomer to unextractable polymer.

The ferrated derivative of cellulose may be either a salt, chelate or complex. While the exact nature of the derivative is unknown, the derivative can easily be produced by the method described above. The derivative is stable and can be stored for more than a week, after which it is still capable of inducing a free radical graft copolymerization.

The compounds produced according to this invention have useful chemical and physical properties such as improved absorbency and greatly improved ion exchange properties. Further, compounds such as a poly (2-ethylhexylacrylate Co cellulose oxyethylene sulfide) yield fibers or sheets with outstanding water repellency and thermoplasticity. In addition, cellulosic materials with exceptional dimensional stability, improved electrical properties and resistance to bacterial degradation have been prepared by the method of this invention. The novel cellulose graft copolymers may also be used as ion exchange materials. When grafts are formed from monomers having acid moieties, such as acrylic acid, the copolymers are cation active. When grafts are formed from monomers having amine moieties such as methacrylic acid esters derived from amino alcohols, such as listed above, the copolymers are anion active. The fibrous nature of the ion exchange active cellulose makes it particularly attractive in applications such as catamenial devices, both internal and external, and in metal ion scavengers, to name a few. The fibrous properties of novel graft copolymers are especially attractive in paper and nonwoven fabric manufacture. A judicious choice of monomer or monomers allows variations of properties, such as water repellency in case of a graft made from 2-ethylhexylacrylate, or water absorbency if the side chain is made from acrylic acid. If the graft is derived from acrylic acid, the novel cellulose becomes highly hemostatic.

What is claimed is:
1. The process of producing a copolymer of ethylenically unsaturated compounds and derivatives of cellulose containing material comprising the steps of reacting alkali cellulose containing material with an organic sulfide selected from at least one member of the group consisting of:
   (1) cyclic sulfides of from 5 to 8 carbon atoms having the thiirane structure, and
   (2) an alkylene sulfide of the formula

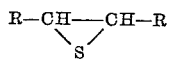

where the R's are selected from the group consisting of:
   (a) hydrogen,
   (b) alkyl of 1 to 7 carbon atoms,
   (c) mono-, di- and trihalo substituted alkyl groups of from 1 to 7 carbon atoms, provided when R is of a single carbon atom, it is substituted by one halogen atom;
   (d) alcohols of from 1 to 7 carbon atoms;
   (e) esters of said thiirane alcohols wherein the acid moiety is selected from the group consisting of:
      (i) fatty acids of from 1 to 7 carbon atoms,
      (ii) aromatic acids of from 7 to 15 carbon atoms,
   (f) ethers of said thiirane alcohols wherein the alcohol of said ether is selected from the group consisting of:
      (i) aliphatic alcohols of from 1 to 7 carbon atoms,
      (ii) aromatic alcohols of from 7 to 15 carbon atoms,
to produce a water-insoluble cellulose sulfide derivative, thereafter reacting the cellulose sulfide derivative with a soluble iron salt to yield a ferrated cellulose sulfide derivative; and reacting the ferrated cellulose sulfide derivative with at least one ethylenically unsaturated monomer capable of forming copolymers in the presence of a peroxidic free radical initiator in an aqueous solution, said monomer being capable of forming copolymers with ethylenically unsaturated compounds.

2. The process according to claim 1 wherein the soluble iron salt is a ferrous salt.

3. The process according to claim 1 wherein the soluble iron salt is a ferric salt.

4. The process according to claim 1 wherein the alkylene sulfide is ethylene sulfide.

5. The process according to claim 1 wherein the alkylene sulfide is propylene sulfide.

6. The process according to claim 1 wherein the ethylenically unsaturated monomer is selected from the group consisting of:
   (1) alkylacrylic acids of from 0 to 5 atoms in the alkyl chain;
   (2) alkylacrylic acid esters of from 0 to 5 carbon atoms in the alkyl chain wherein the esters are formed from alcohols selected from the group consisting of
      (a) alkyl alcohols of from 1 to 20 carbon atoms,
      (b) cycloalkyl alcohols of from 5 to 8 carbon atoms,
      (c) polyhydric alcohols of from 2 to 10 carbon atoms,
      (d) condensation products of alkylene glycols of from 2 to 6 carbon atoms,
      (e) nitro alcohols wherein the alkyl chain is of from 2 to 7 carbon atoms,
      (f) substituted amino alcohols of from 2 to 7 atoms in the alkylene chain, and from 1 to 7 carbon atoms in the chains on the amino moiety,
      (g) cyanoalkyl alcohols wherein the alkyl chain is of from 2 to 7 carbon atoms;
   (3) alkylacrylic acid amides of from 0 to 5 carbon atoms in the alkyl chain wherein the amide is formed from the precursors selected from the group consisting of ammonia, primary and secondary amines, and primary and secondary diamines of from 2 to 16 carbon atoms;
   (4) alkylene glycol dialkyl acrylates of from 0 to 5 carbon atoms in the alkyl chain wherein the alkylene glycols are selected from the group consisting of:
      (a) alkylene glycols of from 2 to 8 carbon atoms,
      (b) the glycol ethers, and
      (c) the glycol polyethers,
   (5) aliphatic esters of 1-olefin alcohols containing from 2 to 24 carbon atoms in the acid chain and wherein the 1-olefin alcohol precursor is of from 2 to 8 carbon atoms;
   (6) ethylenically unsaturated aliphatic diacids and their esters and amides of from 4 to 10 carbon atoms;
   (7) copolymerizable aliphatic diene compounds;
   (8) aliphatic 1-olefins of from 2 to 24 carbon atoms;
   (9) 1-olefin ethers of aliphatic compounds wherein the 1-olefin is of from 2 to 8 carbon atoms and the aliphatic moiety is of from 1 to 7 carbon atoms;
   (10) ethylenically unsaturated nitrile compounds;
   (11) aromatic acid esters of unsaturated alcohols wherein the alcohol precursor is of from 2 to 7 carbon atoms and wherein the aromatic compound contains of from 1 to 4 acid groups;
   (12) ethylenically unsaturated heterocyclic compounds wherein the heterocycle contains of from 3 to 5 carbon atoms and the hetero atom is selected from the group consisting of N, O, and S;
   (13) aromatic compounds having ethylenically unsaturated substituents wherein the aromatic compound is further substituted by groups selected from the class consisting of:
      (a) alkyl of from 1 to 7 carbon atoms,
      (b) halogen, and
      (c) alkyl of from 1 to 7 carbon atoms substituted by halogen
   and wherein the ethylenicaly unsaturated moieties are of from 2 to 5 carbon atoms and are further substituted by groups selected from the class consisting of:
      (a) alkyl of from 1 to 3 carbon atoms,
      (b) halogen.

7. The process according to claim 6 wherein the monomer is acrylic acid.

8. The process according to claim 6 wherein the monomer is acrylamide.

9. The process according to claim 6 wherein the monomer is acrylonitrile.

10. The process according to claim 6 wherein the monomer is styrene.

11. The process according to claim 6 wherein the monomers are styrene and 2-ethylhexylacrylate.

12. The process according to claim 6 wherein the ethylenically unsaturated monomer is 2-cyanoethylacrylate.

13. The process according to claim 1 wherein an alkali cellulose is reacted with an alkylene sulfide until about 6 to 80 percent of said organic sulfide has been reacted to the alkali cellulose based on the weight of the cellulose, the ferrated cellulose sulfide derivative is reacted with the monomer in an aqueous buffered solution containing an emulsifying agent in an amount sufficient to form a stable emulsion and the peroxidic free radical initiator is added to the solution containing the monomer and the ferrated cellulose sulfide derivative, the reaction is allowed to proceed at a temperature of from 0 to 100° C. for from about 5 minutes to about 96 hours, and the formed graft copolymer is then purified.

14. The process according to claim 12 wherein the organic sulfide is selected from the group consisting of cyclic sulfides of from 5 to 8 carbon atoms in the cyclic compound; thiirane, 2-methyl thiirane, sym-dimethyl thiirane, 2-chloromethyl thiirane, 2-phenyl thiirane, bithiirane, and sym-dithiirane methyl ether; the soluble iron salt is selected from the group consisting of ferric bromide, ferric chloride, ferric nitrate, ferric sulfide, ferrous acetate, ferrous ammonium sulfate, ferrous bromide, ferrous chloride and ferrous sulfate; and the ethylenically unsaturated monomer is selected from the group consisting of N,N-dialkyl amino ethyl acrylate where the alkyl is of from 1 to 7 carbon atoms, alkyl acrylic acid esters wherein the alkyl is of from 1 to 5 carbon atoms and wherein the alcohol precursor is derived from alcohols of from 1 to 20 carbon atoms, alpha-unsaturated-omega-alcohols of from 3 to 8 carbon atoms; acrylamide; acrylonitrile; 2-cyanoethylacrylate; aliphatic bis-acrylamide wherein the aliphatic chain is of from 1 to 10 carbon atoms; fatty acid esters wherein the alcohol precursor is an alpha-unsaturated-omega alcohol; substituted aromatic compounds having substituents on the aromatic ring selected from the group consisting of at least one alpha-alkylene group of from 2 to 6 carbon atoms, halogen groups, and alkyl groups of from 1 to 5 carbon atoms.

15. The process according to claim 14 wherein the peroxidic free radical initiator is selected from the group consisting of hydrogen peroxide, ammonium persulfate, alkali persulfate, t-butyl hydroperoxide, cumene hydroperoxide, and benzoyl peroxide.

16. The products obtained according to claim 1.

17. The products obtained according to claim 4.

18. The products obtained according to claim 13.

19. The process of producing a ferrated cellulose material comprising the steps of reacting, an alkali cellulose containing material with a sulfide selected from the group consisting of:
cyclic sulfides of from 5 to 8 carbon atoms having the thiirane structure, and an alkylene sulfide of the formula

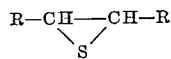

where the R's are selected from the group consisting of:
hydrogen;
alkyl of 1 to 7 carbon atoms;
mono-, di- and trihalo substituted alkyl groups of from 1 to 7 carbon atoms, provided when it is of a single carbon atom, it is singly substituted by a halo atom;
alcohols of from 1 to 7 carbon atoms;
esters of said thiirane alcohols wherein the acid moiety is selected from the group consisting of:
fatty acids of from 1 to 7 carbon atoms, aromatic acids of from 7 to 15 carbon atoms;
ethers of said thiirane alcohols wherein the ether moiety of said alcohol is selected from the group consisting of:
aliphatic alcohols of from 1 to 7 carbon atoms, aromatic alcohols of from 7 to 15 carbon atoms;

thereafter reacting said cellulose sulfide derivative with a soluble iron salt selected from the group consisting of soluble ferrous salts and ferric salts to yield with said cellulose sulfide derivative a ferrated derivative capable of undergoing a redox copolymerization reaction; and purifying the ferrated cellulose derivative.

20. The process according to claim 19 wherein the organic sulfide compound is a mixture of thiirane and 2-methyl thiirane.

21. The products obtained according to claim 19.

References Cited

UNITED STATES PATENTS 2,922,768   1/1960   Mino et al. _____ 260—17.4

FOREIGN PATENTS 818,412   7/1959   Great Britain.

WILLIAM H. SHORT, Primary Examiner.

J. NORRIS, Assistant Examiner.